United States Patent Office 3,264,702
Patented August 9, 1966

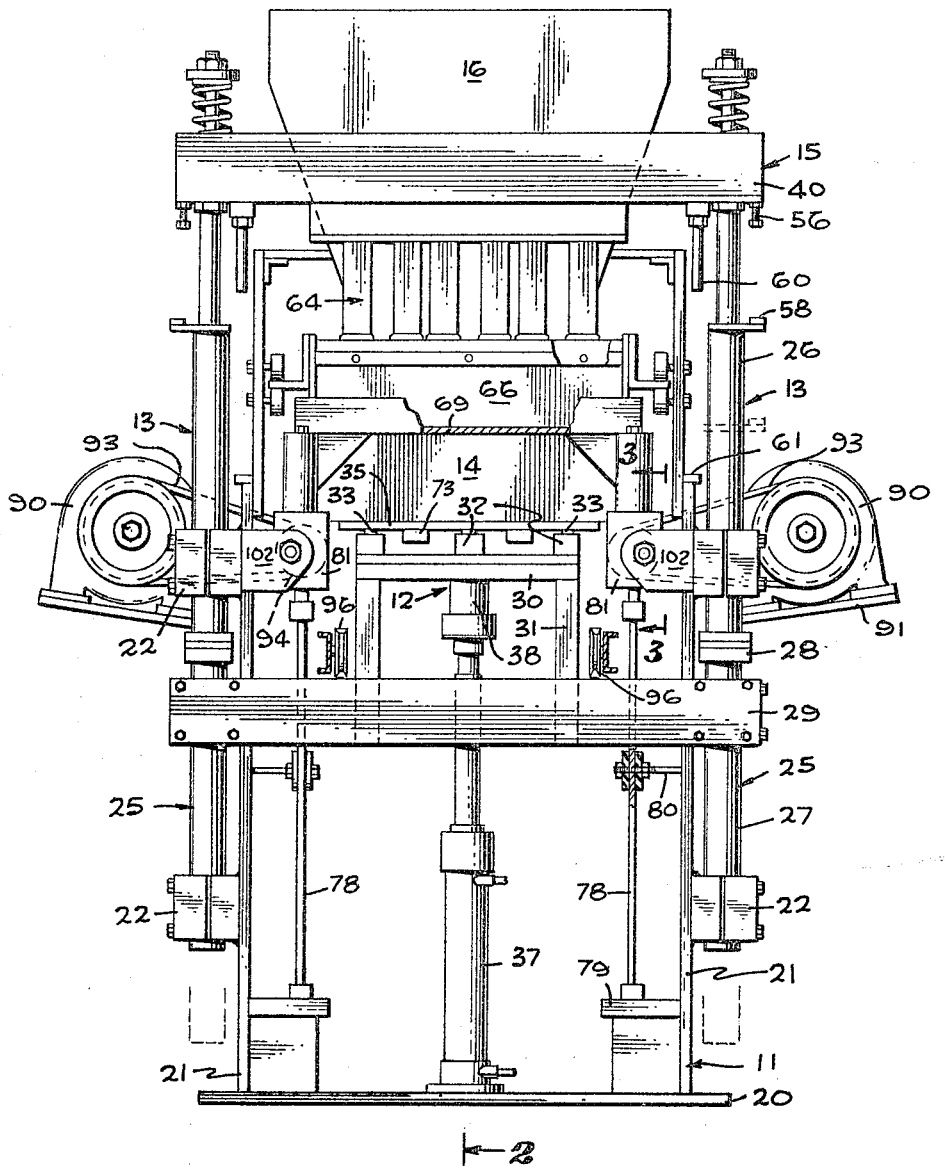

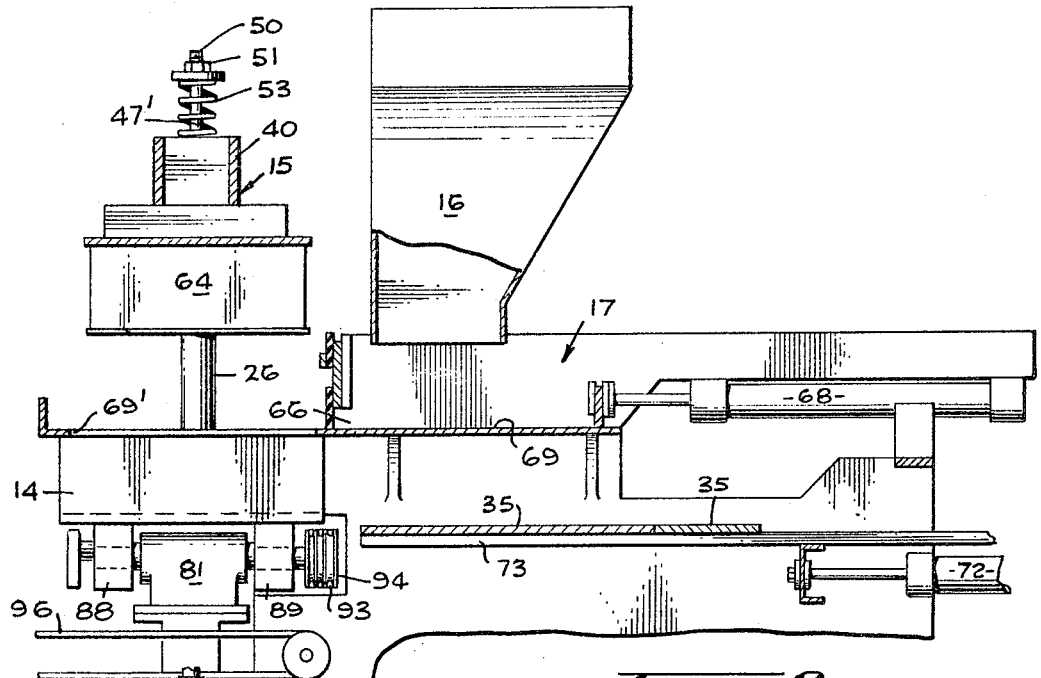
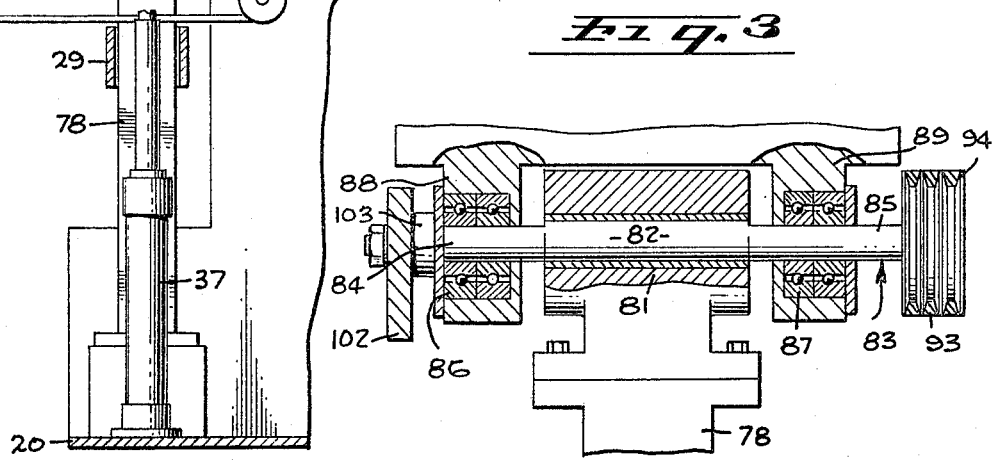

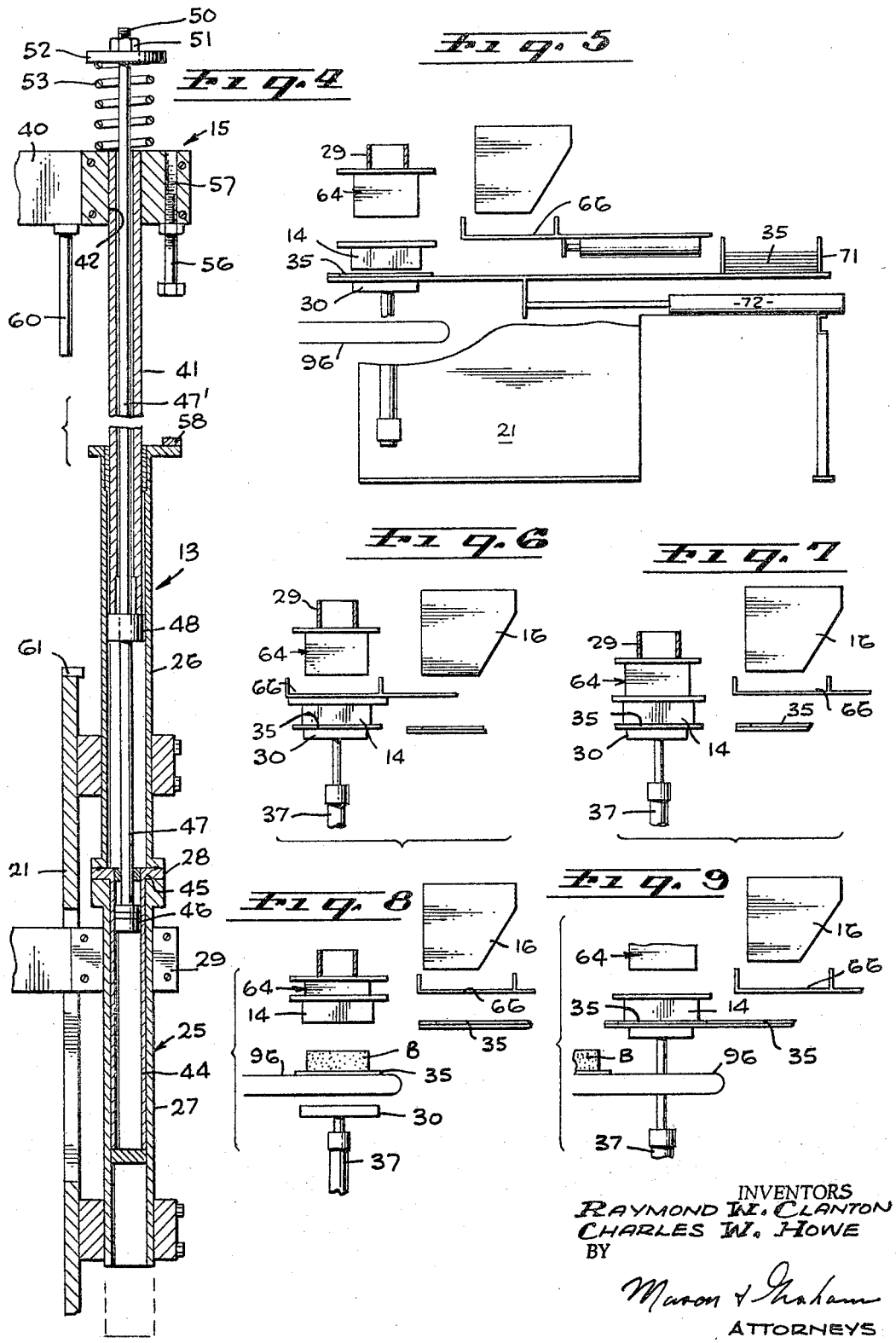

3,264,702
MACHINE FOR MOLDING CONCRETE BLOCKS
Raymond W. Clanton, 9735 Orcas Ave., Sunland, Calif., and Charles W. Howe, Sunland, Calif.; said Howe assignor to said Clanton
Filed Mar. 23, 1964, Ser. No. 354,078
9 Claims. (Cl. 25—41)

This invention has to do with apparatus for molding concrete blocks and the like.

An object of the invention is to provide a new and improved machine for molding concrete blocks which embodies hydraulic means for operating the principal moving parts, which is highly efficient, and which can be manufactured at relatively moderate cost.

Another object is to provide a machine of the type indicated which is economical to operate and to maintain. In this connection it is an object to provide a machine in which much of the operating mechanism is protected from dirt but is nevertheless readily accessible.

A further object is to provide a machine having a relatively rapid cycle of operation which is faster and smoother than conventional machines embodying mechanical drive means for the principal moving parts.

Another object is to provide, in a machine of the type indicated, improved means for mounting and operating the principal movable elements, including particularly the head beam assembly and the table assembly.

A further object is to provide a machine which can be readily and quickly adjusted for making blocks of various heights.

A still further object is to provide novel means for mounting and vibrating the mold.

These and other objects will be apparent from the drawings and the following description. Referring to the drawings:

FIG. 1 is a front elevational view of a machine embodying the invention;

FIG. 2 is a fragmentary sectional view on line 2—2 of FIG. 1;

FIG. 3 is a fragmentary sectional view on line 3—3 of FIG. 1, but on a larger scale;

FIG. 4 is a sectional view of the guide tube assembly at the right-hand side of the machine as viewed in FIG. 1, but on a larger scale; and FIGS. 5, 6, 7, 8 and 9 are diagrammatic views illustrating successive positions of the principal moving parts during a cycle of operation as viewed from the side of the machine.

More particularly describing the invention, in general the machine includes a frame 11, a table assembly 12, a pair of guide tube assemblies 13 mounted on the frame for limited movement vertically and to which the table assembly is fixed, a mold 14, a head beam assembly 15, a hopper 16 and a feed drawer assembly 17.

The frame includes a base plate 20 and vertically disposed side plates 21 which are spaced laterally. The side plates are each provided with a pair of vertically spaced bearings 22 which slideably support main guide members or tubes 25 of the guide tube assemblies for limited vertical movement. Each guide tube is made of two sections for convenience of manufacture and assembly, and for maintenance, namely, a lower section 26 and an upper section 27 with a bolted flanged joint 28 therebetween. The guide tubes and the table assembly are connected together to operate as a unit by a table beam 29 which is attached at its ends to the lower sections 26, respectively, of the guide tubes. Beam 29 carries a table 30 upon upright legs 31, the table including three sets of interrupted rails 32 provided with pads 33 on their upper surfaces. The function of the table is to support a pallet 35 beneath and against the under surface of the mold 14 during the molding operation, the pallet forming the floor of the mold, and to lower the pallet with the cast or molded blocks thereon at the completion of the molding operation. In FIG. 1 the table assembly 12, guide tubes 25, and the head beam assembly 15 are all shown in raised or up position.

For the purpose of raising and lowering the table assembly 12 as required during the operation of the machine, we provide a double-acting piston-cylinder unit 37 for operation by pressure fluid which is mounted upon the base 20 of the frame and which extends upwardly, being connected to a suitable coupling 38 carried by the table. If desired, shock-absorbing means (not shown) may be incorporated.

The head beam assembly 15 is mounted upon or carried by the guide tubes 25 and to accomplish this, the head beam proper, designated 40, is provided with a pair of auxiliary guide tubes 41 which are received in the main guide tubes 25, respectively, for axial movement therein. The auxiliary guide tubes are fixed in bores 42 (FIG. 4) in the head beam. For the purpose of actuating the head beam to raise and lower it and to support it, each main guide tube is provided with a cylinder 44 having a flange 45 at its upper end. In each case the cylinder receives a piston 46 having an upwardly extending piston rod 47 provided with a cylindrical abutment or collar 48 beneath the adjacent auxiliary guide tube 41. An extension 47' of the piston rod extends above the abutment 48 freely through the auxiliary guide tube and freely through the head beam terminating thereabove. The upper end of each extension is threaded at 50 to receive a nut 51 which secures a washer or circular plate 52. A coil spring 53 is interposed between the plate 52 and the upper surface of the head beam. It will be seen that with the construction outlined, the head beam is mounted for limited movement relative to the piston rods 47, 47' and downward movement of the piston provides a resilient pulldown force on the head through the springs. However, when the pistons 46 are moved upwardly, this movement is transmitted directly to the head beam by means of the abutments or collars 48 which are forced against the lower end of the auxiliary guide tubes. The piston-cylinder 46, 44, is double acting although the fluid connections are not shown.

The head beam is provided with two sets of stops to limit its downward movement. One set comprises bolts 56 mounted in threaded bores 57 at the ends of the beam which strike pads 58 on the upper ends of the main guide tubes when such tubes are in the raised position. The other set of stops comprises two adjustable rods 60 mounted in the head beam inwardly of the stops 56 and adapted to strike pads 61 on the frame thereby serving to provide an ultimate limit to the amount of downward travel of the head beam.

Head beam 40 carries mold stripper or stripping means 64 of suitable configuration which is used for compacting and leveling the concrete mix in the mold and determining the height of the blocks molded therein, and also for expelling the blocks from the mold.

Rearwardly of the mold 14 there is provided a horizontally disposed feed drawer 66 actuated by a fluid-operated piston-cylinder unit 68 which serves to carry the concrete mix forward over a floor 69 from a position beneath the hopper 16 to and over the mold 14 where the floor is apertured at 69'. A supply of pallets 35 is provided at 71 and a suitable fluid-operated piston-cylinder unit 72 is utilized for operating a feed means 73 which acts to feed the pallets one by one beneath the mold where they are supported by the table 30. Since the details of the feed drawer mechanism and the pallet feed are not essential parts of the invention and can be constructed and operated by persons skilled in the art, no detailed description thereof will be included.

One of the features of the invention is the manner or means for mounting and vibrating the mold 14. The latter comprises a box-like member which is open at the top and botom and is provided with a suitable core or cores (not shown) to produce the required shape and size of cavities in the mold. The mold is supported upon a pair of upright springy posts or supports 78 which are formed of steel and are relatively thin in their smallest dimension. These posts are mounted on bases 79 and in each case supported intermediate their ends by a horizontal rod 80 mounted on the frame. At the upper end of each post (FIG. 3) is a bearing 81 which journals an eccentric portion 82 of a shaft 83. End sections 84 and 85 of the shaft are journaled in bearings 86 and 87, respectively, provided in depending portions 88 and 89, respectively, of the mold. An electric motor 90 mounted on a platform 91 of the frame drives each shaft by means of belts 93 extending around sheaves 94 fixed to the eccentric shaft and sheaves (not shown) on the motor shaft. The motors 90 may be operated during any portion of the molding operation and normally are operated to vibrate the mold during filling thereof and up to the time the molded blocks are removed from the mold. The shafts 83 may be operated at the same speed, or at different speeds if desired. Also the throw of the eccentrics can be varied by substitution of parts.

While the posts 78 are shown as vertically straight in the drawing, we have found it advantageous to bow these slightly, especially in their upper part between the supports 80 and the mold 14, by reason of the fact that, when so bowed, the posts appear to prevent phase synchronization of the two motor-driven eccentric shafts 83. Vibration of the concrete mix is better when the vibrators are not in phase.

Considering now the operation of the apparatus, and referring to FIGS. 5–9 in which certain steps of the operation are illustrated, in FIG. 5 the pallet feed has moved a pallet 35 beneath the mold and the pallet is held against the bottom of the mold to form a floor or bottom thereof by the table assembly 12 being raised to the upper position. Raising the table assembly also raises the main guide tubes 25 to which it is fixed. Presure fluid enters the cylinders 44 beneath pistons 46 simultaneously with its entrance into the lower end of cylinder 37 thereby raising the head beam. The feed drawer 66 then moves forward as shown in FIG. 6 to fill the mold and vibration may begin at this time. The feed drawer is retracted (FIG. 7) and the head beam assembly 15 then moves down relative to the other parts so that the stripping means 64 slightly enters the mold to form the upper wall thereof, the downward movement being limited and predetermined by the stops 56 which abut pads 58 at the upper ends of the tubes 25, thereby determining the height of the blocks to be molded. After the concrete mix has been compacted, the table assembly, the guide tube assembly and the head beam assembly all move down to eject the blocks from the mold, downward movement of the head beam assembly being limited by the stops 60 striking pads 61 on the frame. When the table moves down sufficiently (FIG. 8), the pallet 35 carrying the blocks B comes to rest upon two narrow conveyor belts 96 and is carried away, after which the table assembly may be raised by pressure fluid supplied to the lower part of cylinder 37. At this time pressure fluid is also supplied to cylinder 44 beneath piston 46 to raise the head beam relative to the guide tube assembly. In the meantime, a new pallet is brought forward into position beneath the mold where it will be engaged and held by the table. The cycle is then repeated.

Preferably the various piston-cylinder units are operated by hydraulic fluid and it is contemplated that a suitable hydraulic system with electrical controls can be provided by one skilled in the art and such system and controls are not a part of the invention.

Since the forward movement of the feed drawer carrying a charge of concrete tends to move the mold assembly forward and thereby introduce undue loading factors on the bearings in which the vibrator shafts 83 are journaled, we provide a bracket 102 on the frame at each side of the machine and support an abutment 103 thereon and between the bracket and adjacent depending portion 88 of the mold to prevent this. The abutment may be of bronze or other suitable material.

Although we have illustrated and described a preferred form of our invention, we contemplate that various changes and modifications can be made therein without departing from the invention, the scope of which is indicated by the following claims.

We claim:

1. In a machine for molding concrete blocks and the like, a frame, a pair of vertically disposed main guide tubes mounted on said frame in parallel, laterally spaced relation for limited vertical movement, a table assembly between said tubes and mounted thereon, means for raising and lowering said table assembly and said tubes as a unit, a mold mounted on said frame above said table assembly, a head beam mounted on said main guide tubes above said mold for vertical movement relative to said guide tubes and carrying mold stripper means, and means for raising and lowering said head beam relative to said guide tubes.

2. The machine set forth in claim 1 in which main stop means is provided for limiting downward movement of the head beam relative to the frame and in which auxiliary stop means is provided for limiting downward movement of the head beam relative to said guide tubes when the latter are in raised position.

3. The machine set forth in claim 1 in which the means for raising and lowering said table assembly and said tubes as a unit comprises a fluid-operated piston-cylinder unit disposed beneath said table assembly.

4. The machine set forth in claim 1 in which the means for raising and lowering said head beam comprises a pressure fluid-operated piston-cylinder unit housed in each guide tube and operably engageable with the head beam.

5. In a machine for molding concrete blocks and the like, a frame, a pair of vertically disposed main guide tubes mounted on said frame in parallel, laterally spaced relation for limited vertical movement, a table assembly between said tubes and mounted thereon, means for raising and lowering said table assembly and said tubes as a unit, a mold mounted on said frame above said table assembly, a head beam above said mold and having a pair of auxiliary guide tubes depending therefrom and slideably received in said main guide tubes, a fluid-operated piston-cylinder unit housed in each main guide tube operable to support and to raise and lower said head beam relative to said main guide tubes, said head beam carrying mold stripper means.

6. In a machine for molding concrete blocks and the like, a frame, a pair of vertically disposed main guide tubes mounted on said frame in laterally spaced, parallel relation, a fluid-operated piston-cylinder unit housed in each guide tube, a head beam above said main guide tubes, a pair of auxiliary guide tubes mounted on said head beam and depending therefrom, said auxiliary guide tubes being slideably received for axial movement in said main guide tubes, respectively, a piston rod on the piston of each piston-cylinder unit having an abutment engageable with the lower end of the adjacent auxiliary guide tube, an extension rod on each piston rod extending upwardly through the adjacent auxiliary guide tube and said head beam for movement relative thereto and terminating above said head beam, and a spring interposed between the upper end of each extension rod and the head beam, a table assembly between said main guide tubes and mounted thereon, said main guide tubes being mounted for limited vertical movement, means for raising and lowering said table assembly and said main guide tubes as a unit, a mold mounted on said frame between said head beam and said table assembly, and mold stripper means carried by said head beam.

7. The machine set forth in claim 6 in which main stop means is provided between said frame and said head beam for limiting downward movement of said head frame, and in which auxiliary stop means is provided between said head beam and said main guide tubes for limiting downward movement of said head beam relative to the guide tubes when the latter are in raised position.

8. In a machine for molding concrete blocks and the like, a frame, a pair of vertically disposed main guide tubes mounted on said frame in parallel, laterally spaced relation for limited vertical movement, a horizontal table beam fixed at its ends to said main guide tubes, respectively, a table carried by said beam, a fluid-operated piston-cylinder unit mounted on said frame and operatively connected to raise and lower said table beam and said guide tubes as a unit, a mold mounted on said frame above said table, a horizontal head beam above said mold supported by said guide tubes for limited vertical movement relative thereto, said head beam carrying mold stripper means, and means carried by said guide tubes for raising and lowering said head beam.

9. In a machine for molding concrete blocks and the like, a frame, a pair of elongated, vertically disposed guide members mounted on said frame in parallel, laterally spaced relation for limited vertical movement, means connecting said guide members to form a unitary structure, means for raising and lowering said guide members as a unit, a mold mounted on said frame, a head beam mounted on said guide members above said mold for vertical movement relative to said guide members and carrying mold stripper means, and means for raising and lowering said head beam relative to said guide members.

References Cited by the Examiner

UNITED STATES PATENTS

| | | | |
|---|---|---|---|
| 2,620,541 | 12/1952 | Davies et al. | 25—41 |
| 2,831,230 | 4/1958 | Neth et al. | 25—84 |
| 2,863,343 | 12/1958 | Steinfort et al. | 100—264 |
| 2,961,730 | 11/1960 | Marino | 25—41 |
| 2,985,935 | 5/1961 | Wellnitz | 25—41 |
| 3,013,321 | 12/1961 | McElroy | 25—41 |
| 3,057,033 | 10/1962 | Russell | 25—41 |
| 3,153,833 | 10/1964 | Jackson | 25—41 |
| 3,153,834 | 10/1964 | Boyer et al. | 25—41 |

J. SPENCER OVERHOLSER, *Primary Examiner.*

G. A. KAP, *Examiner.*